Jan. 18, 1966     R. ENGEL ETAL     3,230,318
TRANSDUCER
Filed March 31, 1961
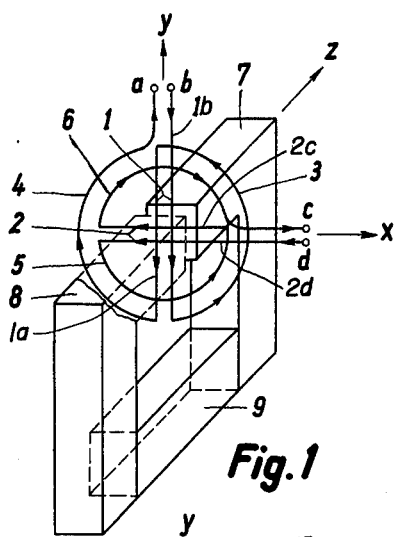
Fig. 1
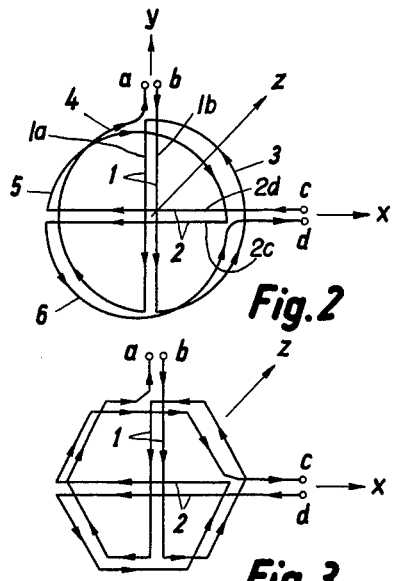
Fig. 2
Fig. 3
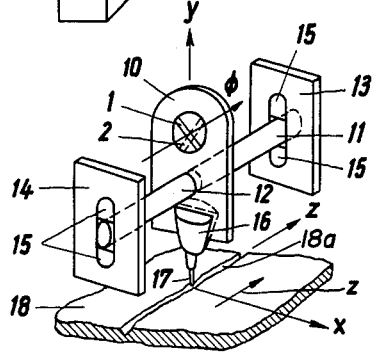
Fig. 4
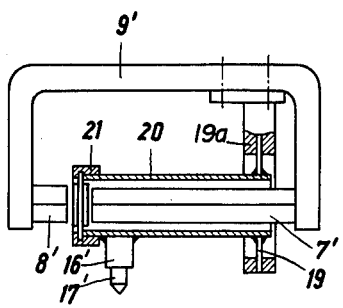
Fig. 5
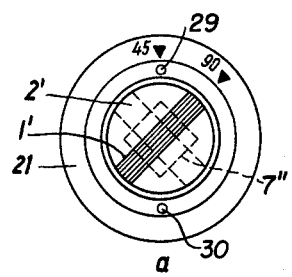
Fig. 6
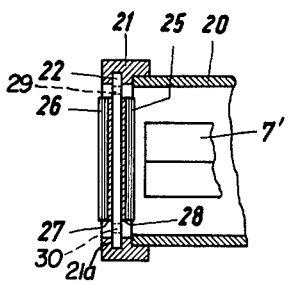
Fig. 7
INVENTORS
Rudolf Engel &
Horst Redlich
BY *Georgett Spencer*
ATTORNEY

United States Patent Office 3,230,318
Patented Jan. 18, 1966

3,230,318
TRANSDUCER
Rudolf Engel, Berlin-Frohnau, and Horst Redlich, Berlin-Wilmersdorf, Germany, assignors, by mesne assignments, to Telefunken Aktiengesellschaft
Filed Mar. 31, 1961, Ser. No. 99,801
Claims priority, application Germany, Apr. 8, 1960,
T 18,201
20 Claims. (Cl. 179—100.41)

The present invention relates to the windings and structure of an electromechanical transducer of the electrodynamic type for use, for example, as a microphone, a telephone unit or loudspeaker, or a recording or playback transducer in the disk recording of sound.

Transducers employing the electrodynamic principle are known to introduce especially small distortion because of the linear relationship between the motive forces and the current induced or between the voltages delivered and the velocity of movement. Unfortunately, however, prior-art electrodynamic transducers are comparatively complicated, and the devices constructed using this principle are correspondingly expensive.

In these devices there also exists the difficulty that their output can be influenced by disturbing outside fields permeating the windings of the coils. Therefore, compensating coils or means for shielding the devices from foreign fields must frequently be used in connection with such transducers.

An electromechanical transducer for converting sound energy into electrical voltage is known wherein a single linear conductor oscillates in a homogeneous magnetic field perpendicularly to the direction of the lines of force. Since in this transducer only a single conductor moves as a winding, the output voltage produced is extraordinarily small. In addition, compensating means and shielding means have to be used to compensate for interference voltages produced by foreign fields. Also, sound-track pickups of this type have been known wherein cylindrical or conical coils oscillate in appropriately shaped magnet gaps. Thes designs, however, can be manufactured only with difficulty and require careful adjustment as well as means for compensating for stray interference fields.

The present invention is based on the need for overcoming the difficulties in the known designs mentioned, and provides winding means for an electromechanical transducer capable of securing both a high conversion efficiency plus relative insensitivity to stray interfering fields. In addition, the present transducer with its improved coil design is quite inexpensive to manufacture.

The invention is based on a coil design for an electromechanical transducer, especially for an electrodynamic soundtrack pickup wherein the induced momentary current flows in the same direction through at least two parallel and substantially linear winding portions arranged in a homogeneous magnetic field, the connections between the end of such a winding and the beginning of another winding series-connected therewith lying outside the magnetic field. According to the present invention, these connections and the linear windings are arranged substantially in a common plane which is the plane of movement of the entire transducer armature, and the connections are carried alternately on the one and the other of two curves which, with the center line of the linear winding portions, enclose approximately equally large surfaces and which curves are preferably practically symmetrical with regard to this center line, for example, on circular arcs or parts of a polygon.

The invention presupposes—and this assumption will generally be valid—that an interfering outside field will be present in such a way that its intensity and direction are practically the same on both sides of a plane of symmetry which is perpendicular to the above-mentioned plane of movement and which passes through the center line of the linear transducer windings. According to the present invention, two half coils comprise the opposite sides of the linear winding, one of which coils is wound clockwise and the other counter-clockwise relative to a given orientation in space. The connecting wires lying on the opposite sides of the linear winding portions and extending from the end to the beginning of each linear winding portion thus mutually cancel interference components resulting from stray foreign fields. Thus, only the linear winding portions lying within the local magnetic field produced inside the transducer are active.

The invention produces a further important advantage, in that the design of the winding as a flat coil lying substantially in a plane corresponding to the plane of armature movement results in a coil-body shape which is especially favorable from the point of view of mechanical oscillation theory. The coil body has the shape of a thin wafer or flat disk and may support cemented coil windings or may be designed as some other type of thin plane support.

Since in operation the coil body oscillates only in the direction of its own plane, all acceleration forces acting on it also act in this plane wherein the body possesses its greatest rigidity. Therefore, elastic deformations of the coil body and, because of the small effective accelerating forces, of the entire transducer armature may be kept very small and thus harmless up to very high frequencies. Also the air gap inside the magnetic circuit producing the magnetic field may be kept very narrow.

In practice, a blade-shaped body bounded by parallel plane faces, preferably of a material having a high modulus of elasticity with a low specific gravity, for example a ceramic material, may be used as a support for the winding portions and connections in order to provide the flat coil body with as small a mass as possible and with as high a rigidity as possible.

An armature according to the invention may also be used for the design of a stero transducer for conversion of two signal channels with virtually no mutual coupling between them which correspond to two orthogonal components of motion relative to a common plane of motion. Such a transducer can be equipped with two coils according to the invention whose directions of linear winding portions across one another at right angles. Under the assumption mentioned above, both coils are then not only decoupled with regard to foreign fields but they are also virtually decoupled with regard to one another without requiring special compensating coils. This is almost exactly realized especially if the connections in the two coil systems run parallel to one another at least over the major parts of their lengths and preferably form congruent or similar figures. Preferably, the coils are arranged on the same side or on opposite sides of a common support body in such a way that, with the exception of the parts corresponding to the linear winding portions, their vertical projections on a plane parallel to the plane of motion would coincide.

It is generally desirable to obtain as great a motive power as possible or as great induced voltages as possible considering the size of the linear winding portions. The position of the coil or coils must therefore be chosen in such a way that their linear winding portions are perpendicular to the component of armature movement corresponding to the associated signal.

The invention is especially suited for a transducer for cutting or scanning groove-shaped sound tracks wherein, according to the usual method of cutting single-groove or stereophonic recordings, both channel signals are recorded simultaneously. In such transducers the movable armature may be mounted in any one of a number of different ways, two of the three possible degrees of freedom of the plane motion of the movable armature being used in each case for the conversion of signals corresponding to the two channels. Frequently the mounting of the movable armature is such that the latter performs substantially translatory movements for the hill-and-dale recording components but substantially rotary movements for the lateral recording components. Preferably, the linear winding portions or their crossovers are then arranged near that plane of symmetry of the movable armature perpendicular to the plane of motion which passes through the cutting stylus or scanning needle attached to the armature and which contains the axis of the rotary movements. Of course, the location of the linear winding portions or of their crossovers on or near the plane should not be too near the axis of the rotary movement because otherwise the components of motion corresponding to the rotary movements become too small. In high-fidelity transducers, a mounting of the armature is frequently used wherein the latter performs essentially only translatory movements which may be achieved with good accuracy, for example, by mounting the armature on a tubular or rod-shaped support perpendicular to the plane of motion, which support has great rigidity against rotary movements but is supported by a flexible diaphragm at its clamped end. In this case, the linear winding portions or their crossovers are preferably arranged near the intersection of the axis of inertia or the axis of the moment of resistance of the tubular or rod-shaped support supporting the movable armature. The axis of the coil may pass directly through the front surface of the support, which at its other end is clamped or flexibly supported, for example, as previously mentioned, by fastening the end to the center of a diphragm clamped at its rim. In case a tubular support is used, an element forming part of the magnetic circuit, for example a pole shoe, may be arranged in the interior space of the support.

Additional objects and advantages of the present invention will become apparent upon consideration of the following description when taken in conjunction with the accompanying drawings in which:

FIGURE 1 is a schematic illustration of a transducer having two flat coils disposed virtually in the same plane and located in the gap of a permanent magnet.

FIGURE 2 and FIGURE 3 illustrate modified coils capable of use in similar transducers.

FIGURE 4 shows the movable elements including the stylus and the armature of a record transducer in which linear conductor pairs are disposed on angles of 45° with respect to the plane of a record disk, the magnetic poles being omitted for the sake of simplicity.

FIGURE 5 is an elevation view, partly in section, of a modified form of recording transducer embodying this invention.

FIGURE 6 is an enlarged end view of the armature of the embodiment of FIGURE 5.

FIGURE 7 is an enlarged sectional view taken through a portion of the armature of the embodiment of FIGURE 5.

Referring now to the drawings, FIGURES 1, 2 and 3 serve mainly to illustrate schematically the principle underlying the invention. FIGURE 1 shows two flat coils respectively having terminals $a$, $b$, and $c$, $d$ arranged in the same plane or in two closely adjaecnt planes. The linear conductor portions 1 and 2 of the respective coils form each a pair of parallel conductors through which the instantaneous current flows in the same direction. These linear conductor portions of the two coils cross one another at right angles. Only two linear conductors are shown for each coil in order to facilitate the illustration. The linear conductor portions 1 and 2, respectively, are serially connected together through outer conductor portions of each coil. The direction of the instantaneous current flowing in each coil is indicated on the drawing for the individual winding portions by arrows. Let it be assumed that at the terminal $b$ the current instantaneously flows into the right-hand linear conductor $1b$. From the lower end of this linear conductor the outer conductor 3 carries the current in an arc to the upper end of the left-hand linear conductor $1a$, through which this current now likewise flows from top to bottom. From the lower end of the left linear conductor $1a$ the current flows through the outer conductor 4 to the terminal $a$. It is evident that the right linear conductor $1b$ together with the outer conductor 3 forms a winding around which the instantaneous current flows in a counter-clockwise direction. The left linear conductor $1a$ forms with the outer conductor 4 a corresponding winding around which the same instantaneous current flows in a clockwise direction. The coil is, therefore, insensitive to stray fields permeating its plane, assuming that the field strength and the field direction are on the average the same on both sides of the $y$—$z$ plane of symmetry passing perpendicularly through the center of the coil.

The other coil in FIGURE 1 is designed in a similar manner. A connection is seen to exist from the terminal $d$ through the lower linear conductor $2d$, through the outer conductor 5, the upper linear conductor $2c$, and the outer conductor 6, to the terminal $c$. This coil, too, is insensitive to foreign fields and there is also virtually no coupling thereof with respect to the first coil.

The fact that no coupling exists between the two coils may be seen from the following consideration: The systems of linear conductors are without mutual coupling because they cross one another at right angles. The outer conductors are without mutual coupling because, considering the respective arcs of different coils which run parallel to one another one half of each coil always carries instantaneous currents oppositely directed to the adjacent turns of the other coil, while the other half of the first coil has instantaneous currents flowing in the same direction as those of the other coil. Thus they cancel each other out.

In order to achieve as good a decoupling as possible, it is desirable that the two coils be of the same size and that they be at least approximately congruent regarding the shape of their outer conductors. FIGURE 1 diagrammatically indicates a magnetic circuit consisting of the pole shoes 7 and 8 defining an air gap containing only the linear conductor of the winding portions, and excited by a permanent magnet 9.

Let it be assumed that in operation the armature formed by the two flat coils moves within the plane determined by the axes $x$ and $y$. In the case of a movement in the $x$-direction a voltage will appear at the terminals $a$ and $b$ since the linear conductors 1 intersect lines of force within the air gap. No voltage will appear, however, at the terminals $c$ and $d$ due to this same movement because the linear conductors 2 do not cut any lines of force. Conversely, a voltage appears at the terminals $c$ and $d$ if the coil armature moves in the direction of the $y$-axis. It is assumed that no motion of the armature takes place in the direction of the $z$-axis in which the lines of the magnetic flux in the gap run.

FIGURE 2 shows a coil device similar to the one shown in FIGURE 1. The principal difference lies in the coil connected to the terminals $c$ and $d$, which coil is merely inverted and reconnected to these terminals. From the terminal $c$ current flows in the direction of the arrows first through the outer conductor 5 through the upper linear conductor $2d$ and then to the right-hand beginning of the lower linear conductor $2c$, and thence from its left end through the outer conductor 6 to the terminal $d$. It is evident that in this case, too, the pairs of linear conductors 1 and 2 are without mutual coupling. The consideration of the relations existing between the outer conductors 3, 4, 5, and 6 shows that there is likewise no uncancelled coupling between these conductors.

FIGURE 3 shows a modified coil design demonstrating that it is not necessary to dispose the outer conductors on circular arcs. In FIGURE 3 these connections form the sides of a regular hexagon, likewise resulting in the desired decoupling between the two coil systems.

FIGURE 4 shows, in perspective, the movable part of a sound-track transducer for single-groove stereophonic recording, including armature supports. Of the coil systems only the linear conductor portions 1 and 2 are illustrated, the coils being fastened on the sides of a blade-shaped armature 10. This armature 10 may be constituted by a ceramic body having a low specific gravity and a large modulus of elasticity. The pick-up stylus 17 is fastened to the armature by means of a holder 16. The armature is supported by the halves 11 and 12 of a shaft extending from both sides, which halves are fixed in openings of metal guide plates 13 and 14 in which they can carry out vertical and/or rotary movements. In these openings there are rubber cushions 15 arranged as suspension elements for damping the vertical movements and rotary movements of the shaft. The pick-up stylus 17 is shown engaging a sound track groove 18a of a record 18, which sound track moves in the direction shown by the arrow Z. This direction corresponds with the direction of the z-axis in the previously described illustrations and also with the direction of the magnetic flux $\phi$ permeating the linear conductors 1 and 2 from the magnet pole pieces (shown in FIGURE 1).

Let it be assumed that a stereophonic signal is recorded in the sound track groove in the known 45°-recording. The pick-up stylus then moves in the plane of the x- and y-axes, the components corresponding to the two signals being recorded at angles of +45° and −45° with regard to the y—z plane. The mounting shown makes it possible for the armature 10 of the transducer to execute vertical movements corresponding to the vertical components of the two signal recordings, while the armature 10 also performs rotary movements around the axis of the shaft 11, 12 corresponding to the horizontal components of the two stereo signals. Under the conditions given by the kinematics of this system, the movements of the stylus are duplicated by the movements of the linear conductor portions 1 and 2. If these latter conductors are also located substantially in the x—y plane of symmetry, and if they are just about as far away from the axis of rotation as the stylus, the linear conductor portions must be arranged with an inclination of about +45° and −45° with respect to the surface of the record 18 for the separate transducing of the two stereo signals. If the conductors are arranged at other angles relative to the plane of symmetry or at another distance from the axis of rotation, compensations would be needed in the linear conductor systems.

FIGURE 5 is an especially advantageous embodiment of a sound track transducer for single-groove stereophonic recording wherein a wound armature according to the invention is used. The movable armature is shown in FIGURE 5 at a cross section taken through the center of symmetry of the plane of motion and perpendicular to it along the axis of the magnetic pole shoe 7'. The magnetic circuit consists of a horseshoe magnet 9' and the pole shoes 7' and 8' which form a magnetic air gap wherein the coils are disposed. The movable armature comprises essentially a tubular support 20 which is fastened to the center of a diaphragm support 19. The rim of the diaphragm is clamped in a ring 19a which is supported by the horseshoe magnet 9'. The stylus 17' is fastened to the tubular support 20 by means of a holder 16'. The armature support for the two coils which oscillate in the magnetic gap is located on the front of the tubular support 20 within a sleeve 21 surrounding the end of this support. The front part of the armature is shown enlarged in FIGURES 6 and 7. In an annular groove 21a of the sleeve 21 there is fixed a disk 22 on which the coils 25 and 26 are mounted. Electrically conductive layers 27 and 28, respectively, are arranged on each side of the coil disk 22 between the adjacent coil and the face of the disk. Such a layer has the effect of shielding the two coils from one another so that no capacitive coupling exists therebetween. Moreover, the eddy currents generated in these layers due to movements of the system in the magnetic field effect mechanical damping of the movement. Also, electric resonance phenomena in the circuits of the coils 25 and 26 are damped out by dissipation of energy due to the currents induced thereby in these layers. If it is not desired to damp the mechanical movement, the electrical dissipation may be effected by transferring the conductive layers from the disk 22 to the neighboring stationary pole shoes 7' and 8' by simply coating the opposed pole faces of these pole shoes adjacent the coils with copper.

FIGURE 5 also shows that the stylus 17' is fastened to the tubular support 20 at a point between the plane of the coil and the diaphragm 19 mounting the support. In this way, mechanical amplification of the movements of the disk and therefore of the linear conductor portions of the coils at the support disk 22 can be achieved in response to the deflections of the stylus 17'.

FIGURES 6 and 7 show that the coil disk 22 may be rotated to achieve electrical correction as set forth above by means of two holes 29 and 30 which may be engaged by a suitable tool. In this way, the whole system may be adjusted so that cross-talk from the one signal channel to the other is minimized. In addition, by this same angular positioning of the disk the scanner may be changed over from 45°-recording to 90°-recording in the record groove. The case shown in FIGURE 6 is for scanning of a 45°-recording. If, however, the upper hole 29 is placed on the appropriate wedge-shaped indicia labeled "90," the same scanner can also be used for reproducing a 90°-recording.

In FIGURE 6, dashed lines 7'' show a projection of the pole shoe. It will be seen that the cross-sectional outlines of this pole shoe are parallel and perpendicular, respectively, to the linear conduction portions 1' and 2' of the coils. In this way, during movements at 45° angles corresponding to the deflection directions of the two signal channels, excitation of a maximum voltage is accomplished in the conductors of one coil, while substantially zero excitation occurs in the other coil.

It will be understood that the above description of the present invention is susceptible to various modifications, changes, and adaptations, and the same are intended to be comprehended within the meaning and range of equivalents of the appended claims.

We claim:

1. An electromechanical transducer comprising in combination: magnet means having two opposite poles pieces aligned along a common axis and including mutually spaced parallel pole faces having an air gap therebetween; armature means and means for movably mounting the latter with respect to said magnet means, said armature means including coil support means substantially disposed in a plane extending through said air gap and parallel with said pole faces and the coil support means having an active zone located directly between the pole faces and having a coupling zone surrounding said active zone and located outside of the space directly between said pole faces; two systems of windings supported on said coil support means, each system including terminal means and at least two mutually parallel linear conductors passing through the active zone and symmetrically disposed about said axis, the linear conductors of each system crossing the linear conductors of the other system at right angles; coupling conductors joining said linear conductors additively in series and coupling them with said terminal means, said coupling conductors in each system lying in said coupling zone and being substantially symmetrically disposed peripherally about said air gap on opposite sides of a plane including said axis and disposed parallel with the linear conductors of the same system, said linear and coupling conductors lying in substantially the same plane, said plane being parallel to said plane extending through said air gap, and said coupling conductors forming two half coils comprising, respectively, the opposite sides of the linear conductors, one of which half coils is wound clockwise and the other of which half coils is wound counter-clockwise relative to a given orientation in space; and phonograph stylus means carried by said armature means.

2. In a transducer as set forth in claim 1, the coil support means comprising a flat disk disposed across said air gap and normal to said axis and said conductors being attached to the surfaces of said sheet, said disk having an axial length which is small as compared to its diameter; and armature support means mounting said sheet for movement in a plane of motion which is also normal to said axis.

3. In a transducer as set forth in claim 2, said coil support means comprising a sheet of ceramic material having a high modulus of elasticity and low mass.

4. In a transducer as set forth in claim 1, wherein said stylus means are coupled with said coil support means and have an axis normally intersecting the axis of the magnet poles, said stylus means serving to track the groove of a recording medium and translate motions between the groove and the coil support, and said linear conductors being disposed substantially normal to components of said motion lying in the plane of the coil support.

5. In a transducer as set forth in claim 1, said transducer having two systems of windings mounted on said coil support in mutually insulated relation and having their respective linear conductors cross each other substantially at said axis; said stylus means being coupled with said coil support means and having an axis intersecting the axis of the magnet poles, said stylus means serving to track the groove of a stereophonic recording medium and translate quadrature motions representing separate recording channels between the groove and the coil support, and the linear conductors of the separate systems being each disposed substantially normal to the components of motion in the plane of the coil support corresponding with the associated recording channel.

6. In a transducer as set forth in claim 5, said two systems of windings being mounted on respectively opposite surfaces of said coil support means with the linear conductors of the systems mutually crossed and the coupling conductors being substantially superimposed.

7. In a transducer as set forth in claim 5 for use in tracking a stereophonic recording having hill-and-dale recording for one channel and transverse recording for the other channel, the linear conductors of one system being disposed normal to the axis of the stylus means and the linear conductors of the other system being disposed parallel therewith.

8. In a transducer as set forth in claim 4, said armature means comprising: a rod shaped member passing through said coil support means between the stylus means and the active zone of the coil support means, the latter being rotatably supported on said member, whereby transverse motions of the stylus means in the recording groove oscillate the support means and produce similar motions of the active zone in the air gap.

9. In a transducer as set forth in claim 4, said armature means comprising a support member fixed with respect to the magnet means against rotation at one end, and supporting said coil support means at its other end, whereby transverse motions of the stylus means in the recording groove laterally displace said other end of the support member with respect to said axis of the magnetic pole pieces.

10. In a transducer as set forth in claim 9, said support member comprising a rigid tube having said coil support means disposed across one of its ends; a yieldable diaphragm having its outer periphery fixed with respect to said magnet means and having said tube attached substantially normal to its surface and spaced from its periphery.

11. In a transducer as set forth in claim 10, said tube surrounding one of said pole pieces and the diaphragm normally supporting the tube coaxially with the axis of the pole pieces.

12. In a transducer as set forth in claim 10, said stylus being fixed to the tube with its axis passing through the axis of the tube at a location intermediate the ends of the tube.

13. In a transducer as set forth in claim 11, said coil support means comprising a disk across the open end of said tube and carrying two winding systems; and annular mounting means for rotatably mounting the disk on the tube whereby the angles of the crossed linear conductors with respect to a plane including the axes of the stylus means and of the tube can be adjusted to adapt the transducer to recording groove motions at different angles with respect to the axis of the stylus means.

14. In a transducer as set forth in claim 1, said coil support means comprising a thin sheet of insulating material disposed across said air gap, and said systems of windings comprising conductors supported on the faces of the sheet; and at least one conductive layer carried on said sheet and interposed between said winding systems.

15. For use in combination with means for producing a homogeneous magnetic field, a coil system for an electromechaniical transducer having a component and means for mounting said component for movement relative to the magnetic field such that an instantaneous current flows in the same direction through two sets of at least two parallel and substantially linear winding portions arranged in the homogeneous magnetic field with the linear winding portions of each set crossing the linear winding portion of the other set at right angles and that the connection between the end of each winding portion and the beginning of a subsequent winding portion serially connected therewith lie outside said magnetic field, said connections and said linear winding portions being arranged substantially in a common plane which is the plane of movement of said movable component, said connections being located alternately on the one and on the other of two curves which, with the center line of said linear winding portions, enclose approximately equally large surfaces, said connections forming two half coils comprising, respectively, the opposite sides of the linear winding portions, one of which half coils is wound clockwise and the other of which half coils is wound counterclockwise relative to a given orientation in space; a phonograph stylus; and means for connecting said coil system and said stylus to form a substantially rigid structure.

16. A coil system as defined in claim 15 wherein said curves are substantially symmetrical with respect to said center line.

17. A coil system as defined in claim 16 wherein said curves are circular arcs.

18. A coil system as defined in claim 16 wherein said curves are part of a polygon.

19. An electromechanical transducer for producing or playing back two signals in a groove-shaped sound track which signals are written in with mutually perpendicular directions of oscillation, said transducer comprising a carrier mounted for movement in a given plane and carrying a stylus and two coils acting as transducer elements, each coil having a set of linear winding portions with the two sets of linear winding portions crossing each other at right angles and being at right angles to the component of movement of a respective one of the two signals; said linear portions of each set having flowing therethrough, in the same direction, the same instantaneous driving or induced current; there being means for producing a homogeneous magnetic field which is common to said linear portions of said coils and whose lines of flux are at right angles to said plane of movement of said carrier; each of said coils having portions each of which joins the end of one linear portion with the end of another linear portion of the same set, in series with the one linear portion, said joining portions lying outside of said magnetic field; said joining portions and said linear portions of each coil lying in substantially the same plane which plane is parallel to said plane of movement of said carrier; said joining portions of each coil lying, alternately, on the one side and on the other side of the center line of the pertaining linear coil portion, each of said joining portions forming a respective half coil one of which is wound clockwise and the other of which is wound counter-clockwise relative to a given orientation in space; said joining portions enclosing areas of approximately the same size, which areas are substantially symmetrical with respect to said center line.

20. An electromechanical transducer as defined in claim 19 wherein said carrier and said coils together have the shape of a flat disk whose axial length is small with respect to its diameter, whereby said means for producing said magnetic field may be configured to provide a narrow air gap within which said coils may move.

References Cited by the Examiner
UNITED STATES PATENTS

| | | | |
|---|---|---|---|
| 2,034,872 | 3/1936 | Keller | 179—100.41 |
| 2,967,214 | 1/1961 | Vanderlyn | 179—100.41 |
| 3,040,136 | 6/1962 | Grado | 179—100.41 |

IRVING L. SRAGOW, *Primary Examiner.*

JOHN P. WILDMAN, BERNARD KONICK,
*Examiners.*